(12) United States Patent
Hellige et al.

(10) Patent No.: US 12,451,660 B2
(45) Date of Patent: Oct. 21, 2025

(54) ATTACHMENT HOUSING FOR HIGH-PERFORMANCE PLUG CONNECTOR

(71) Applicant: HARTING Electric Stiftung & Co. KG, Espelkamp (DE)

(72) Inventors: Denny Hellige, Bad Oeyenhausen (DE); Frank Böhmann, Lastrup (DE); Walter Gerstl, Breitenfurt bei Wien (AT); Shao Wei Wen, Zhuhai (CN)

(73) Assignee: HARTING Electric Stiftung & Co. KG, Espellamp (DE)

( * ) Notice: Subject to any disclaimer, the term of this patent is extended or adjusted under 35 U.S.C. 154(b) by 520 days.

(21) Appl. No.: 17/916,604

(22) PCT Filed: May 3, 2021

(86) PCT No.: PCT/DE2021/100401
§ 371 (c)(1),
(2) Date: Oct. 3, 2022

(87) PCT Pub. No.: WO2021/228320
PCT Pub. Date: Nov. 18, 2021

(65) Prior Publication Data
US 2023/0155330 A1 May 18, 2023

(30) Foreign Application Priority Data
May 12, 2020 (CN) .......................... 202010396993.4

(51) Int. Cl.
*H01R 13/74* (2006.01)
*B61G 5/10* (2006.01)
(Continued)

(52) U.S. Cl.
CPC ............. *H01R 13/748* (2013.01); *B61G 5/10* (2013.01); *H01R 13/502* (2013.01); *H01R 13/6592* (2013.01); *H01R 2201/26* (2013.01)

(58) Field of Classification Search
CPC ............. H01R 13/502; H01R 13/5126; H01R 13/518; H01R 13/6492; H02G 3/10; H02G 3/16; H02G 3/18; H02G 3/22
(Continued)

(56) References Cited

U.S. PATENT DOCUMENTS

2008/0115955 A1* 5/2008 Gorin ..................... H02G 3/085
174/66
2010/0319988 A1* 12/2010 Sandberg ................. H02G 3/22
174/656

(Continued)

FOREIGN PATENT DOCUMENTS

EP 2845277 A2 11/2013
WO WO-2013164420 A2 * 11/2013 ................ F16L 5/14

*Primary Examiner* — Abdullah A Riyami
*Assistant Examiner* — Amara Anderson
(74) *Attorney, Agent, or Firm* — Smartpat PLC

(57) ABSTRACT

The attachment housing for connecting at least one high-performance plug connector comprises at least two housing elements. At least one housing element is mounted on a support structure and designed to accommodate at least one electrically conductive cable. The housing element and the support structure each have at least one corresponding opening, which openings allow at least the feed-through of an electrically conductive cable. The attachment housing also comprises at least one counter-pressure frame which is located on a side of the support structure opposite the attachment housing and is connected to the attachment housing.

9 Claims, 4 Drawing Sheets

(51) Int. Cl.
*H01R 13/502* (2006.01)
*H01R 13/6592* (2011.01)

(58) Field of Classification Search
USPC .......................................... 439/296
See application file for complete search history.

(56) References Cited

U.S. PATENT DOCUMENTS

| | | | |
|---|---|---|---|
| 2017/0125936 A1* | 5/2017 | Loetkemann | H01R 13/514 |
| 2017/0279217 A1* | 9/2017 | Wimmer | H01R 13/746 |
| 2020/0086896 A1* | 3/2020 | Horstmann | B61G 5/06 |
| 2021/0408774 A1* | 12/2021 | Hellige | H02G 3/085 |

* cited by examiner

ATTACHMENT HOUSING FOR HIGH-PERFORMANCE PLUG CONNECTOR

TECHNICAL FIELD

The disclosure relates to an attachment housing for high-performance plug connectors. Such attachment housings for high-performance plug connectors are required in particular to produce electrical lines between rail-borne vehicle elements.

BACKGROUND

The prior art includes various attachment housings for high-performance plug connectors. Usually, heavy support structures are necessary for the mounting of these attachment housings in order to avoid damage to the attachment housing and/or the support structure, since a high degree of vibration is to be expected, especially in the field of rail-borne transportation.

CN201910083940A discloses a feedthrough housing for feeding one or more lines and/or cables out of or into a closed area, the housing consisting of a housing body and a matching, removable housing cover, wherein the housing body has a breakthrough opening and at least one exit opening, the planes of which are oriented substantially perpendicular to one another.

The support structures known from the prior art must have a certain wall thickness or mass in order to be able to reliably support the feedthrough housings in the long term and to provide an adequate shield transmission device, or shield connection options for improved electromagnetic compatibility (EMC). Since the support structures may be, in particular, equipment walls or freight car walls, the necessary massive construction will result in high costs.

SUMMARY

The problem addressed by the disclosure is that of offering an attachment housing for high-performance plug connectors which offers the possibility of using lighter support structures. As a result, the equipment, freight cars of rail vehicles or the like using the attachment housings can be built lighter and, in particular, more cost-effectively. The lightweight construction now possible means that energy can be saved, especially in rail transport.

The problem is solved by the subject manner of the independent claims.

Advantageous embodiments of the invention are described in the dependent claims and the following description.

An embodiment of the attachment housing according to the invention has at least two housing elements for connecting at least one high-performance plug connector. In this case, at least one housing element is mounted on a support structure and is set up to receive at least one electrically conductive cable. The housing element and the support structure each have at least one corresponding aperture, allowing at least one electrically conductive cable to be passed through, wherein the attachment housing further comprises at least one counter-pressure frame. The counter-pressure frame is arranged on the side of the support structure opposite the attachment housing and is connected to the attachment housing.

A high-performance plug connector means in particular an electrical plug connector which is at least partially made of metal and is designed for high current strengths and/or voltages, that is to say, for example, current strengths of more than 50 amperes, in particular more than 100 amperes, preferably current strengths of more than 250 amperes, in particular current strengths of more than 500 amperes. Alternatively or additionally, voltages above 60 V, in particular above 220 V, for example above 600 V, that is to say also voltages above 1000 V, can be transmitted via such a plug connector. For protective grounding, the plug connector can have at least one PE ("Protection Earth") contact, for example in the form of a PE screw.

An attachment housing equipped with a counter-pressure frame can ensure sufficient safety, even with a structurally lightened support structure, to adequately protect the attachment housing and the associated support structure from damage caused by vibration and loading "under tension". In this way, in particular a rail-bound transport vehicle (hereinafter also referred to as a rail vehicle), especially a passenger transport car, can be embodied with a reduced outer wall. In this way, material and weight are saved and operational safety is nevertheless adequately ensured. The counter-pressure frame distributes the force required to securely connect the attachment housing to the support structure over a larger area. If, for example, threaded holes were used to connect the attachment housing and the support structure, vibrations occurring could lead to loosening of the screw connection. In the worst case scenario, a screw connection could tear out of the support structure if the tensile force is too great. By distributing the forces that occur, the concentrated load is advantageously reduced.

A further development of the embodiment according to the invention provides an attachment housing, the counter-pressure frame of which is embodied at least in one piece. A one-piece counter-pressure frame simplifies the mounting of the counter-pressure frame on the support structure or on the associated attachment housing. As a retrofit solution, it can be useful to embody a counter-pressure frame in at least two pieces. For this purpose, for example, two basically L-shaped plates are used, which are attached to a support structure around an already laid electrical cable. Ideally, these plates with recess and shaped portions can be interlocked, mortised or comparably engaged with each other. In this way, a multi-piece counter-pressure frame is formed which can apply a comparably effective areal distribution of the forces as compared to a one-piece counter-pressure frame.

An advantageous embodiment provides that the counter-pressure frame has at least one aperture which correlates in principle with the aperture of the support structure. In this way, a distribution of the occurring tensile forces in a manner surrounding the aperture can be achieved. At the same time, the edge region of the aperture is supported circumferentially and material fatigue caused by vibrations occurring during operation is inhibited/prevented.

In a preferred embodiment, the counter-pressure frame has at least two through-openings, which are formed for connecting the at least one housing element to the counter-pressure frame. In particular, a counter-pressure frame with three, four, five or six through-openings is preferred. These through-openings may be integrally formed, for example in a primary shaping manufacturing process. Alternatively, the through-openings are removed in a machining process. The attachment housing is then provided with connecting elements at corresponding openings. The connecting elements are guided through the support structure. Subsequently, in one embodiment, the counter-pressure frame is brought up to the support structure and fastened to the support structure with the connecting elements. By way of example, washers and nuts are used to fasten the counter-pressure frame to the connecting elements on the support structure. The connecting elements are, for example, in the form of threaded rods, threaded bolts, plug-in bolts, or screws. Other forms of the connecting elements are also conceivable. In a particularly advantageous manner, the counter-pressure frame is provided with shaped fastening portions. Shaped fastening portions are, for example, threads, grooves, bayonet lock slots, or comparable shaped portions. Furthermore, a threaded sleeve can also be used instead of an incorporated thread.

In a useful embodiment, the counter-pressure frame has at least two fixing openings for fastening at least one cable holder. Advantageously, the counter-pressure frame has one, two or three fixing openings per side. A blind hole is preferably proposed as the fixing opening. Alternatively, a fixing opening can also be embodied as a through-hole. In particular, it is proposed that the fixing opening be provided with an internal thread. According to the invention, a counter-pressure frame with described fixing openings receives at least one cable holder. Depending on the number of cables used, two, three or four cable holders are useful. On the one hand, the cable holder ensures that various cables are sufficiently spaced apart from one another and can maintain this spacing during operation. Furthermore, the cable holder is advantageously made of an electrically conductive material, in particular a metal. The cable holder is fastened to the counter-pressure frame by means of fastening elements, for example screws, inserted into the fixing openings. This embodiment allows the transmission of an electromagnetic shield from at least one connected cable to the attachment housing, the support structure and/or the counter-pressure frame. The shielding element of the cable can be fastened to the cable support using a cable clamp. Alternatively, a cable clamp is used as a cable holder. Thus, the cable clamp is directly connected to the counter-pressure frame through the fixing opening. Consequently, the cable clamp is made of an electrically conductive material. In an equivalent embodiment, the counter-pressure frame is embodied with a shaped fixing portion instead of at least one fixing opening. A threaded pin is proposed as the shaped fixing portion. The cable holder can be placed on this threaded pin and fixed there, for example with a nut.

An alternative embodiment provides that the fixing openings have at least one shaped fastening portion. A preferred shaped fastening portion is a thread, preferably an internal thread. A longitudinally extending groove with a subsequent transversely extending groove is also conceivable. In this way, a quick-release fastener comparable to a bayonet fastener can be used. Furthermore, the fixing opening can have, in its interior, an internal groove running transversely to the longitudinal axis of the fixing opening. This groove can, for example, accommodate latching elements, such as a latching lug, a latching hook or the like. A cable holder according to the invention can thus be easily inserted into the counter-pressure frame in a latching manner.

A further embodiment provides at least one sorting element for sorting cables, wherein the sorting element is attached to the housing element of the attachment housing. A corresponding sorting element has, for example, a grid structure which guides different cables together through the outlet so that the different cables can be connected at a similar position in the attachment housing to a plug connector, a contact element or the like. The sorting element can, for example, be made of plastic and manufactured in an injection molding process. The rods forming the grid structure can be broken out manually to provide space for cables with a larger diameter or cross-section, for example. Alternatively, the cable holder is provided with at least one clamp structure in addition to a grid-like form dividing the aperture into sectors. This clamp structure can enforce cable spacing. Furthermore, such a clamp structure, comparably to the cable holder, allows a shield transmission of connected cables to the ground connection of the attachment housing and/or the counter-holder frame in case of a metallic design.

In a further embodiment, the sorting element is arranged in a region between the housing element of the attachment housing and the counter-pressure frame.

Lastly, in one embodiment, the counter-pressure frame fixes the sorting element to the housing element of the attachment housing.

BRIEF DESCRIPTION OF THE DRAWINGS

An exemplary embodiment of the invention is shown in the drawings and is explained in more detail below. The drawings show.

DETAILED DESCRIPTION

The figures contain partially simplified, schematic representations. In part, identical reference signs are used for like but possibly non-identical elements. Different views of like elements may be scaled differently.

Directional indications such as "left", "right", "top" and "bottom" are to be understood with reference to the figure in question and may vary in the individual representations in relation to the object shown. Superscript letters and numerals as well as subscript letters and numerals after a reference sign serve for orientation purposes and are intended in principle to provide a simplified overview.

Figure 1:
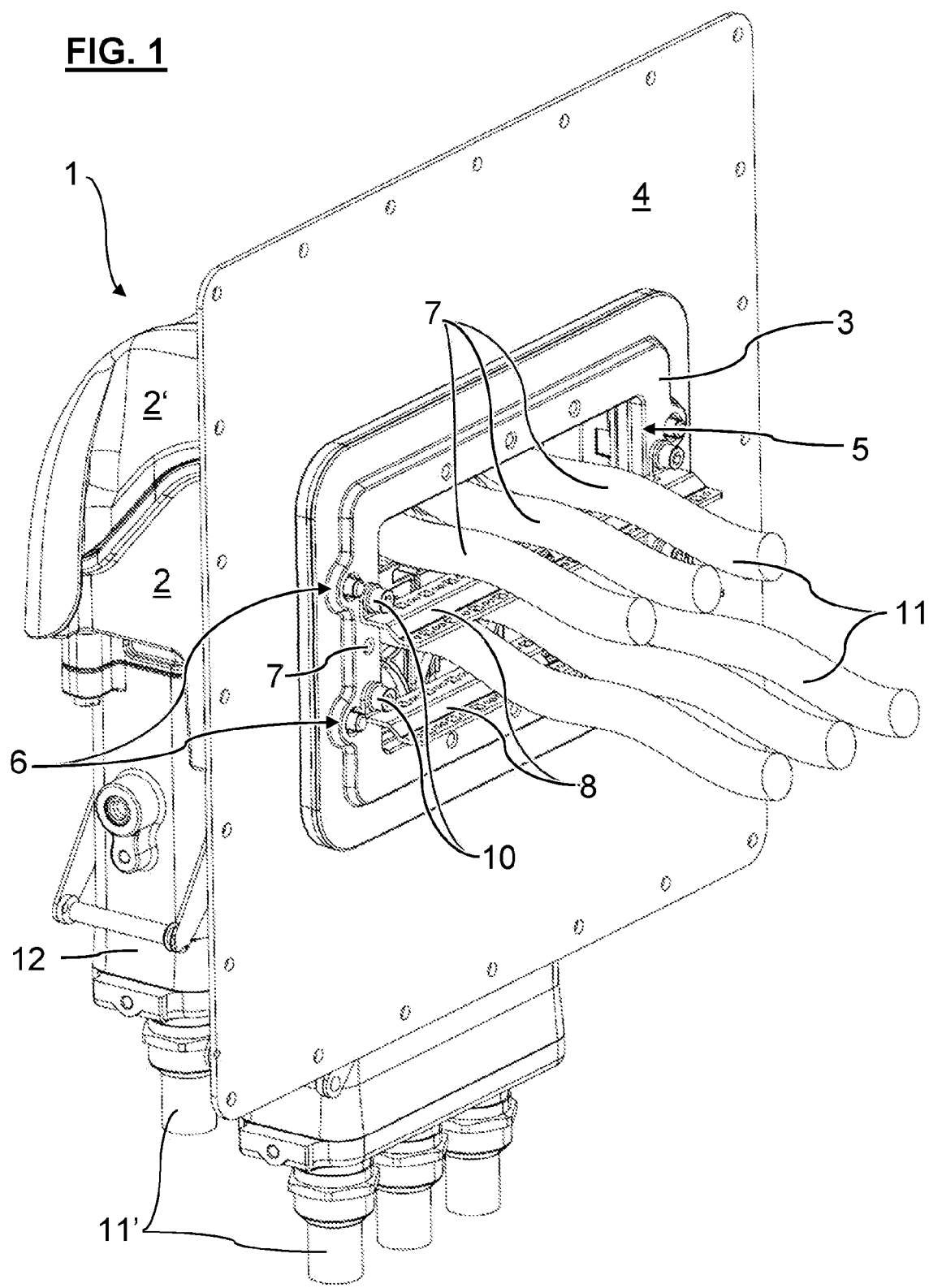
FIG. 1 a perspective view of an attachment housing according to the invention with a rear view of a counter-pressure frame with cable holders.

FIG. 1 shows an attachment housing 1 according to the invention, comprising two housing elements 2 and 2'. The housing element 2' is detachably fastened to the housing element 2. The housing element 2 is fixed to a support structure 4. A counter-pressure frame 3 according to the invention allows a low thickness of the support structure 4 since the counter-pressure frame 3 distributes the necessary forces for fastening the housing elements 2 and 2' over the entire area of the counter-pressure frame 3. Thus, in accordance with the invention, the housing element 2 is held in position by both the support structure 4 and by the counter-pressure frame 3. In addition, loads due to vibration that occur during operation are distributed by the counter-pressure frame 3 areally over the underlying part of the support structure 4. The housing element 2, the counter-pressure frame 3 and the support structure 4 have an aperture 5. This aperture 5 makes it possible to pass through various cables 11, which can be adapted as required. The counter-pressure frame 3 has a basically rectangular shape, but can also be embodied in other geometric shapes. In the illustrated embodiment of the counter-pressure frame 3, it has two through-openings 6 on each narrow side. These through-openings 6 are provided with a shaped fastening portion, for example a thread. Alternatively, the through-openings 6 can be provided with grooves or tracks for bayonet fasteners. Auxiliary means can also be inserted into the through-openings 6. Auxiliary means are to be understood particularly as threaded sleeves, threaded inserts or other types of inserts with a shaped fastening portion. As an alternative to the through-openings 6, blind holes may be used, the opening of which is directed towards the support structure 4. The shown counter-support frame 3 furthermore has three fixing openings 7 on each side. These fixing openings 7 are also provided with shaped fastening portions. The fixing openings 7 can also be equipped alternatively with inserts, in particular with threaded inserts or threaded sleeves. The fixing openings 7 can be embodied as through-openings. Preferably, the fixing openings 7 are embodied as blind holes, the opening of which faces away from the support structure 4. The fixing openings 7 are suitable for fastening cable holders 8 to the counter-support frame 3. In the embodiment shown, screws with a hexagon socket are used as fastening elements 10 for this purpose. Alternative fastening elements will quickly become apparent to a person skilled in the art. The cable holders 8 have openings along both long sides. These can be used to fix the inserted cables 11. For this purpose, for example, cable ties or cable clamps are used. Furthermore, shielding elements of the cables 11 can be attached to the cable holders 8. A shielding effect can be achieved by a metallic embodiment of the cable holders 8.

Figure 2:
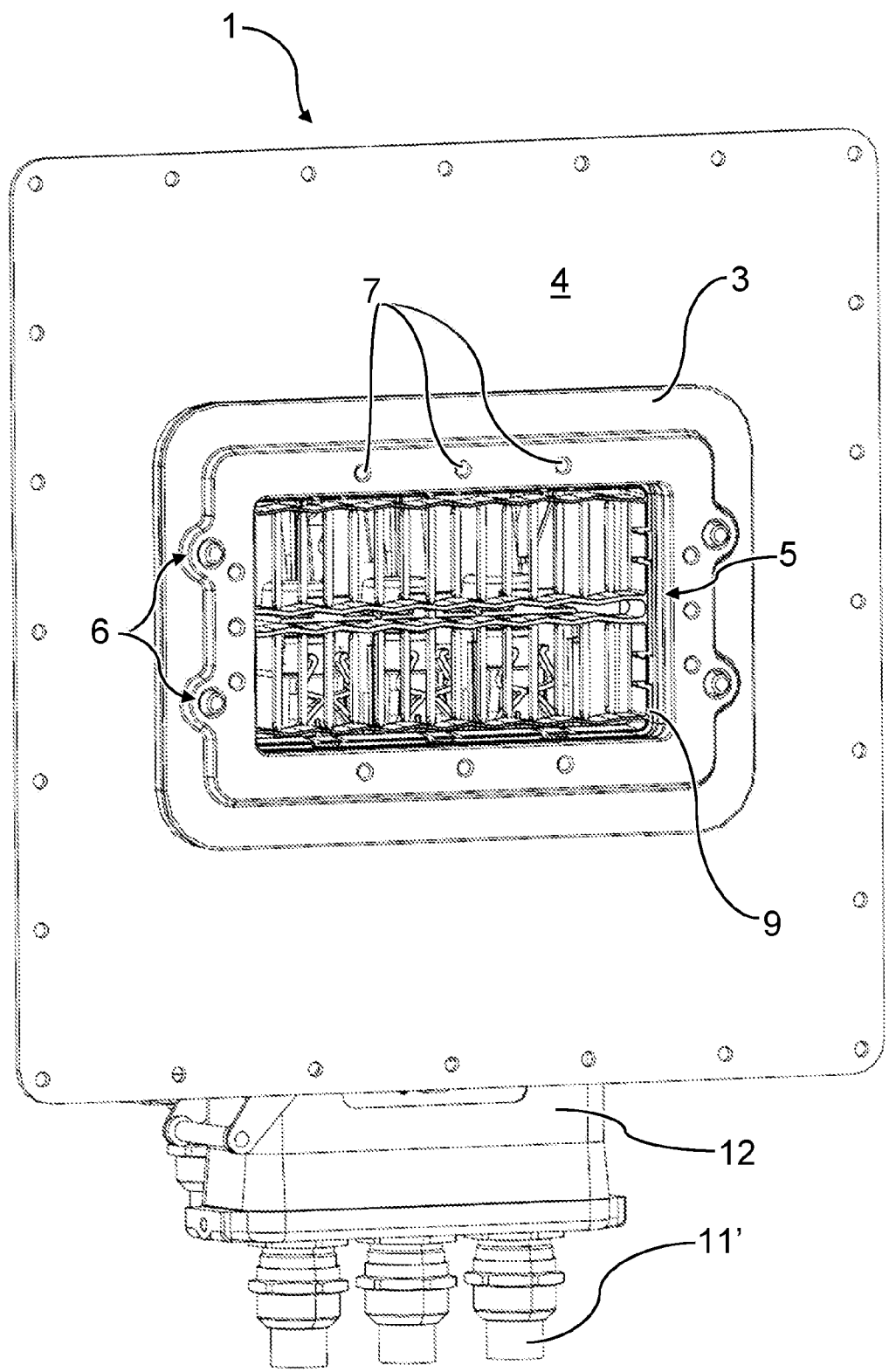
FIG. 2 a perspective view comparable to FIG. 1 with a direct view of a sorting element.

FIG. 2 focuses on a counter-pressure frame 3 according to the invention. Since, unlike in FIG. 1, no cables are shown passing through the aperture 5, a sorting element 9 can be clearly seen. This is fastened in the housing element 2 by latching means and is further fixed in position by the counter-pressure frame 3. Embodied as a metallic grid structure, the sorting element 9 can be used with a shielding effect.

Figure 3:
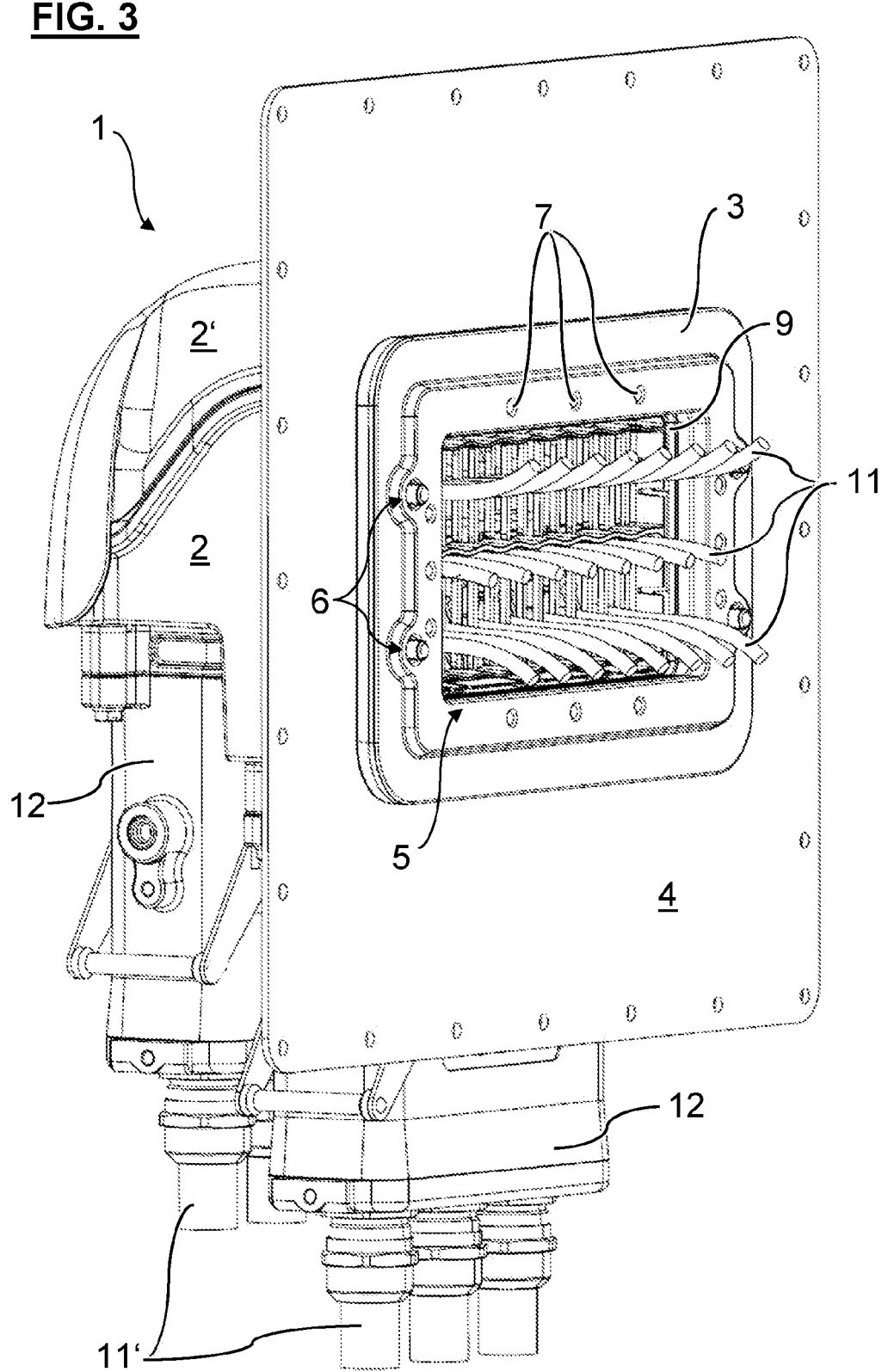
FIG. 3 a perspective view comparable to FIG. 1 with an alternative cable occupation.

FIG. 3 shows a sorting element 9 illustrated in FIG. 2 in a possible use with different cables 11 of varying core cross-section. The embodiment of the sorting element 9 shown in FIGS. 2 and 3 is particularly suitable for cables 11 with a core cross-section of from 0.5 mm² to about 20 mm².

Figure 4:
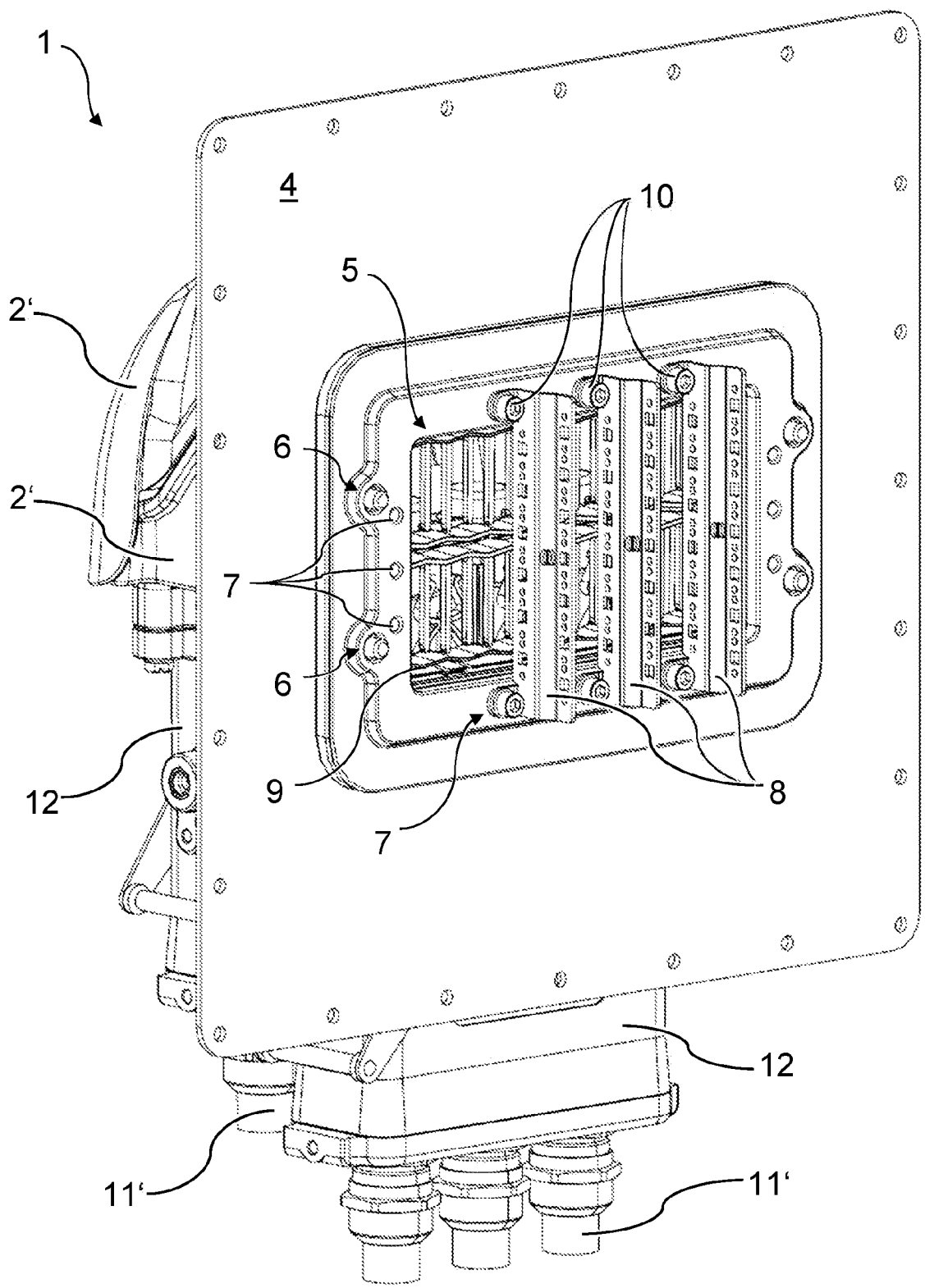
FIG. 4 a perspective view comparable to FIG. 1 with alternative cable holders and alternative sorting element.

Alternative design options for both the cable holders 8 and the sorting element 9 are shown in FIG. 4. In this figure, the sorting element 9 is embodied as a grid with clamping elements located on the horizontal grid bars. This design is particularly suitable for use with cables 11 with a core cross-section greater than or equal to 20 mm², as indicated in FIG. 1. In this embodiment, the cable holders 8 shown run vertically. This allows a different sorting or division of the cables used. A counter-pressure frame 3 formed in this way also allows versatile use of the attachment housing 1. The attachment housing 1 can be used just as reliably when installed horizontally as when installed vertically. The sorting element 9 and the cable holders 8 can provide useful support for this possibility of versatile use.

Even though various aspects or features of the invention are each shown in combination in the figures, it is apparent to a person skilled in the art—unless otherwise indicated—that the combinations shown and discussed are not the only possible ones. In particular, corresponding units or feature complexes from different exemplary embodiments can be exchanged with one another.

The articles "a" and "an" as used in this application should generally be construed to mean "one or more" unless specified otherwise or clear from context to be directed to a singular form.

LIST OF REFERENCE SIGNS

1 attachment housing
2, 2' housing element
3 counter-pressure frame
4 support structure
5 aperture
6 through-opening
7 fixing opening
8 cable holder
9 sorting element
10 fastening element
11, 11' cable
12 high-performance plug connector

The invention claimed is:

1. An attachment housing for connecting a high-performance plug connector, comprising:
   at least two housing elements,
   wherein at least one housing element of the at least two housing elements is mounted on a support structure and is set up to receive electrically conductive cables,
   wherein the at least one housing element and the support structure each have a corresponding aperture, allowing the electrically conductive cables to be passed through, and
   wherein the attachment housing further comprises a counter-pressure frame, which is arranged on a side of the support structure opposite the attachment housing and is connected to the attachment housing,
   wherein the counter-pressure frame is generally rectangular having two narrow sides and two wide sides,
   wherein the counter-pressure frame includes first fixing openings on each of the two narrow sides and second fixing openings on each of the two wide sides,
   wherein the attachment housing is configurable for use
      in a first configuration with first cable holders being arranged horizontally and mounted to the first fixing openings, and
      in a second configuration with second cable holders being arranged vertically and mounted to the second fixing openings.

2. The attachment housing as claimed in claim 1, wherein the counter-pressure frame is made in one piece.

3. The attachment housing as claimed in claim 1, wherein the counter-pressure frame has an aperture, which correlates with the aperture of the support structure.

4. The attachment housing as claimed in claim 1, wherein the counter-pressure frame has at least two through-openings, which are formed for connecting the at least one housing element to the counter-pressure frame.

5. The attachment housing as claimed in claim 1, wherein the first fixing openings and the second fixing openings each have a shaped fastening portion.

6. The attachment housing as claimed in claim 1, wherein a sorting element for sorting and/or fastening the electrically conductive cables is attached to the at least one housing element of the attachment housing, and
   wherein the sorting element is embodied as a grid and includes clamping elements located on horizontal grid bars.

7. The attachment housing as claimed in claim 6, wherein the sorting element is arranged in a region between the at least one housing element of the attachment housing and the counter-pressure frame.

8. The attachment housing as claimed in claim 6, wherein the counter-pressure frame fixes the sorting element to the at least one housing element of the attachment housing.

9. The attachment housing as claimed in claim 1, wherein the counter-pressure frame includes
- a generally rectangular base with four rounded corners at an outer edge, and
- an inner ledge being a concentric rectangle offset inwardly from the outer edge.

* * * * *